US009919458B2

(12) United States Patent
Baghdadi (10) Patent No.: US 9,919,458 B2
(45) Date of Patent: Mar. 20, 2018

(54) METHOD AND THERMOPLASTIC FOAMED ARTICLE

(71) Applicant: NIKE, Inc., Beaverton, OR (US)

(72) Inventor: Hossein A. Baghdadi, Portland, OR (US)

(73) Assignee: Nike, Inc., Beaverton, OR (US)

( * ) Notice: Subject to any disclaimer, the term of this patent is extended or adjusted under 35 U.S.C. 154(b) by 295 days.

(21) Appl. No.: 13/958,531

(22) Filed: Aug. 2, 2013

(65) Prior Publication Data

US 2015/0038607 A1    Feb. 5, 2015

(51) Int. Cl.
| | |
|---|---|
| *B29C 44/02* | (2006.01) |
| *C08J 9/35* | (2006.01) |
| *C08J 9/228* | (2006.01) |
| *B29C 44/34* | (2006.01) |
| *C08J 9/12* | (2006.01) |
| *B29C 44/12* | (2006.01) |
| *B29L 31/50* | (2006.01) |
| *B29K 21/00* | (2006.01) |
| *B29K 23/00* | (2006.01) |
| *B29K 75/00* | (2006.01) |

(52) U.S. Cl.
CPC ........ *B29C 44/025* (2013.01); *B29C 44/1285* (2013.01); *B29C 44/3446* (2013.01); *C08J 9/122* (2013.01); *C08J 9/228* (2013.01); *C08J 9/35* (2013.01); *B29K 2021/003* (2013.01); *B29K 2023/083* (2013.01); *B29K 2075/00* (2013.01); *B29L 2031/50* (2013.01); *C08J 2201/024* (2013.01); *C08J 2201/026* (2013.01); *C08J 2201/03* (2013.01); *C08J 2203/06* (2013.01); *C08J 2203/08* (2013.01); *C08J 2203/182* (2013.01); *C08J 2203/184* (2013.01); *C08J 2205/06* (2013.01); *C08J 2300/22* (2013.01); *C08J 2300/26* (2013.01); *C08J 2323/08* (2013.01); *C08J 2331/04* (2013.01); *C08J 2375/04* (2013.01); *C08J 2400/22* (2013.01); *C08J 2400/26* (2013.01); *C08J 2475/06* (2013.01); *C08J 2475/08* (2013.01)

(58) Field of Classification Search
CPC .............. B29K 2075/00; C08J 2203/08; C08J 2300/26; C08J 9/35
See application file for complete search history.

(56) References Cited

U.S. PATENT DOCUMENTS

| | | | | |
|---|---|---|---|---|
| 4,989,870 A | * | 2/1991 | Janes | .................. A63B 49/022 273/DIG. 8 |
| 5,879,725 A | | 3/1999 | Potter | |
| 2002/0014709 A1 | * | 2/2002 | Arai | ........................ B29C 44/04 264/40.6 |
| 2002/0193459 A1 | | 12/2002 | Haseyama et al. | |
| 2004/0041292 A1 | | 3/2004 | Chen et al. | |
| 2004/0080070 A1 | | 4/2004 | Liu et al. | |
| 2005/0276967 A1 | | 12/2005 | Prasad | |
| 2006/0035993 A1 | | 2/2006 | Chen | |
| 2008/0005856 A1 | | 1/2008 | Hung et al. | |
| 2008/0132591 A1 | * | 6/2008 | Lawrence | ........... B29B 17/0042 521/49 |
| 2010/0083541 A1 | * | 4/2010 | Baucom et al. | ............... 36/25 R |
| 2011/0232135 A1 | | 9/2011 | Dean et al. | |
| 2013/0227861 A1 | | 9/2013 | Prissok et al. | |
| 2014/0151918 A1 | | 6/2014 | Hartman | |
| 2015/0038605 A1 | | 2/2015 | Baghdadi | |
| 2015/0038607 A1 | | 2/2015 | Baghdadi | |

FOREIGN PATENT DOCUMENTS

| | | | |
|---|---|---|---|
| CN | 1400986 A | | 3/2003 |
| CN | 103210010 A | | 7/2013 |
| DE | 4019202 A1 | | 12/1991 |
| DE | 102011108744 A1 | | 1/2013 |
| EP | 1266928 A1 | | 12/2002 |
| EP | 1273418 A2 | | 1/2003 |
| GB | 1182134 | * | 2/1967 |
| GB | 1154965 | | 6/1969 |
| GB | 1154965 A | | 6/1969 |
| GB | 1230992 A | | 5/1971 |
| GB | 1154965 | * | 2/1978 |
| JP | 10151647 | | 6/1998 |
| JP | 2001293741 A | | 10/2001 |
| KR | 1019840000425 B1 | | 4/1984 |
| KR | 100539131 A4 | | 12/2005 |
| WO | 2012065926 A1 | | 5/2012 |
| WO | 2013075994 A1 | | 5/2013 |
| WO | 2015017088 A1 | | 2/2015 |
| WO | 2015017090 A1 | | 2/2015 |

OTHER PUBLICATIONS

Fydor A. Shutov, Integral/Structural Polymer Foams: Technology, Properties and Applications, Dec. 1986, Springer-Verlag Berlin Heidelberg GmbH, p. 59-70.*

(Continued)

*Primary Examiner* — Melissa A Rioja
(74) *Attorney, Agent, or Firm* — Thomas | Horstemeyer LLC (57) ABSTRACT

A method for making a low density foamed article includes placing a desired amount of thermoplastic polyurethane foam beads in a cavity of an injection mold and closing the mold; combining in an extruder connected to the mold a molten polymer selected from the group consisting of thermoplastic polyurethane elastomers and thermoplastic ethylene-vinyl acetate copolymers with both a physical or chemical blowing agent other than a supercritical fluid present in an amount up to about 15 wt % based on molten polymer weight and a supercritical fluid that is at least one of about 0.1 to about 5 weight percent of supercritical $CO_2$ based on molten polymer weight or about 0.1 to about 4 weight percent of supercritical $N_2$ based on molten polymer weight, to form a mixture and injecting the mixture into the mold and foaming the mixture to form the low density foamed article.

42 Claims, 4 Drawing Sheets

(56) References Cited

OTHER PUBLICATIONS

Written Opinion and International Search Report for PCT/US2014/045886 dated Oct. 28, 2014.
International Search Report and Written Opinion for Application No. PCT/US2014/045886, dated Oct. 28, 2014, 14 pgs.
Written Opinion and International Search Report for PCT/US2014/045883 dated Oct. 22, 2014.
Written Opinion and International Search Report for PCT/US2014045880 dated Oct. 22, 2014.
Office Action Issued by the Chinese Patent Office for application 201480043287.4 dated Nov. 10, 2016.

* cited by examiner

METHOD AND THERMOPLASTIC FOAMED ARTICLE

FIELD OF THE INVENTION

The present invention relates to foamed articles of thermoplastic elastomers and methods for making them.

INTRODUCTION TO THE DISCLOSURE

This section provides information helpful in understanding the invention but that is not necessarily prior art.

Thermoplastics are desirable as recyclable materials. However, thermoset materials can have properties better suited for some applications.

Brant et al., U.S. Pat. No. 6,759,443 describes polyurethane foam shoe soles made by foaming a polyurethane made from vinyl polymer-grafted polyoxyalkylene polyether. Polyethylene wax and polytetrafluoroethylene are added to improve abrasion resistance.

Takemura et al., U.S. Pat. No. 6,878,753 describes shoe soles and midsoles made of a thermoset polyurethane foam. The foam is made by a process comprising mixing a polyol solution, which is previously prepared by mixing a polyol, with a catalyst, water and urea, a chain extender, and an additive as occasion demands, with a polyisocyanate compound with stirring in a molding machine; and injecting the resulting mixture into a mold and foaming the mixture. The density of a molded article of the polyurethane foam is said to be 0.15 to 0.45 g/cm$^3$.

Fischer et al., WO 94/20568, describes thermoplastic polyurethane mini-pellet or bead foams with an average diameter of 1-20 millimeters. The polyurethanes are polyester- and polyether-based materials. The bead foams are molded under pressure and heated by introducing pressurized steam.

Prissok et al, US Patent Application Publication No. 2010/0047550 describes a hybrid material with a matrix of polyurethane and foamed particles of thermoplastic polyurethane embedded in the matrix. The hybrid material may be used for making shoe soles. The matrix polyurethane may be foamed during molding.

Prissok et al., US Patent Application Publication No. 2010/0222442 describes an expandable thermoplastic polyurethane including a blowing agent and having a Shore hardness of A 44 to A 84. Foams can be produced from expanded beads of the polyurethane by fusing them to one another in a closed mold with exposure to heat. Prissok et al. teach that the beads are charged to the mold, the mold is closed, and steam or hot air is introduced into the mold to further expand the beads and fuse them together. A foam made in this way is said to have a density in the range of from 8 to 600 g/L.

It can be important for cushioning materials to be resilient and durable, but thermoplastic elastomers providing such properties have generally produced foams of higher density than is desirable in certain applications.

SUMMARY OF THE DISCLOSURE

This section provides a general summary rather than a comprehensive disclosure of the full scope of the invention and of all its features.

Disclosed is a method for making a low density foamed article by placing a desired amount of thermoplastic polyurethane foam beads in a mold then injecting into the mold and foaming in the mold a mixture of thermoplastic polyurethane elastomer or a thermoplastic elastomer ethylene-vinyl acetate copolymer, a supercritical fluid, and up to 15% by weight, based on polymer weight, of a physical or chemical blowing agent other than a supercritical fluid. In the method, the polymer and blowing agent introduced into an extruder, the polymer melts and is mixed with the blowing agent, and the mixture is combined in the extruder with a supercritical fluid. The mixture of the polymer, blowing agent, and supercritical fluid is injected into a mold containing the beads and form a foamed article containing the beads that has a lower density than could be achieved using supercritical fluid alone or using blowing agents other than supercritical fluids alone. The mold may contain a porous tool for absorbing gas generated during foaming of the thermoplastic polyurethane or EVA elastomer.

The foamed thermoplastic polyurethane elastomer or ethylene vinyl acetate articles may have densities of as low as about 0.2 g/cm$^3$. The method may be used to make very low density cushioning components for straps, protective gear, footwear components (such as a midsole or part of a midsole, an outsole, cushioning for a tongue or a sockliner), and for other applications.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Various embodiments are described with reference to the drawings, in which.

DETAILED DESCRIPTION

A detailed description of exemplary, nonlimiting embodiments follows.

The low density foamed article is made providing a mold containing foam beads; injecting into the mold and then foaming a thermoplastic polyurethane elastomer or a thermoplastic ethylene-vinyl acetate copolymer (EVA), wherein the polyurethane or copolymer is foamed using both a supercritical fluid and up to about 15% by weight, based on polymer weight, of a physical or chemical blowing agent other than a supercritical fluid. The foamed product, containing foam beads in a low density foamed polyurethane or EVA matrix.

Foam Beads In Mold

The thermoplastic polyurethane foam mini-pellets or beads may have a density of from about 0.01 to about 0.3 g/cm$^3$. In general, a lower density for the thermoplastic polyurethane foam beads allows a lower density for a product molded from the beads. In various embodiments, the foam beads may have a density equal to or less than about 0.3 g/cm$^3$ or equal to or less than about 0.1 g/cm$^3$. For example, the thermoplastic polyurethane beads may have a density of from about 0.03 to about 0.1 g/cm$^3$. The thermoplastic polyurethane foam beads are prepared from a thermoplastic polyurethane. The beads may be prepared using solely one thermoplastic polyurethane or may be prepared from a polymer blend of two or more thermoplastic polyurethanes. The beads may be integral foams.

The thermoplastic polyurethane from which the foam beads are prepared may have a melt index (also called a melt flow index or melt flow rate) of at least about 160 grams/10 min. (at 190° C., 21.6 kg) as measured according to ASTM D1238. In various embodiments, the melt index may be from about 160 to about 250 grams/10 min. (at 190° C., 21.6 kg) or from about 160 to about 220 grams/10 min. (at 190° C., 21.6 kg), or from about 70 to about 100 grams/10 min. (at 200° C., 10 kg), in each case as measured according to ASTM D1238.

Thermoplastic polyurethanes can be produced via reaction of diisocyanates with difunctional compounds reactive toward isocyanates. In general, the difunctional compounds have two hydroxyl groups (diols) and may have a molar mass of from 62 (the molar mass of ethylene glycol) to about 10,000, although difunctional compounds having other isocyanate-reactive groups (e.g., secondary amines) may be used, generally in minor amounts, and a limited molar fraction of tri-functional and mono-functional isocyanate-reactive compounds may be used. Preferably, the polyurethane is linear. Including difunctional compounds with molar masses of about 400 or greater introduces soft segments into the polyurethane. An increased ratio of soft segments to hard segments in the polyurethane causes the polyurethane to become increasingly more flexible and eventually elastomeric. In certain embodiments, such as when the molded article is an outsole for an article of footwear, the beads may advantageously be prepared using a rigid thermoplastic polyurethane or combination of thermoplastic polyurethanes. In various other embodiments, such as when the molded article is a midsole for footwear, the beads may advantageously be prepared using an elastomeric thermoplastic polyurethane or a combination of elastomeric thermoplastic polyurethanes.

Suitable elastomeric thermoplastic polyurethanes include thermoplastic polyester-polyurethanes, polyether-polyurethanes, and polycarbonate-polyurethanes. Nonlimiting, suitable examples of these include polyurethanes polymerized using as diol reactants polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from alkylene oxides or combinations of alkylene oxides, and polycarbonate diols such as polyhexamethylene carbonate diol and poly(hexamethylene-co-pentamethylene) carbonate diols. The elastomeric thermoplastic polyurethane may be prepared by reaction of one of these polymeric diols (polyester diol, polyether diol, polylactone diol, polytetrahydrofuran diol, or polycarbonate diol), one or more polyisocyanates, and, optionally, one or more monomeric chain extension compounds. Chain extension compounds are compounds having two or more functional groups, preferably two functional groups, reactive with isocyanate groups. Preferably the elastomeric thermoplastic polyurethane is substantially linear (i.e., all or substantially all of the reactants are di-functional).

Nonlimiting examples of polyester diols used in forming the elastomeric thermoplastic polyurethane include those prepared by the condensation polymerization of dicarboxylic compounds, their anhydrides, and their polymerizable esters (e.g. methyl esters) and diol compounds. Preferably, all of the reactants are di-functional, although small amounts of mono-functional, tri-functional, and higher functionality materials (perhaps up to a few mole percent) can be included. Suitable dicarboxylic acids include, without limitation, glutaric acid, succinic acid, malonic acid, oxalic acid, phthalic acid, hexahydrophthalic acid, adipic acid, maleic acid, anhydrides of these, and mixtures thereof. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred embodiment, the carboxylic acid includes adipic acid and the diol includes 1,4-butanediol. Typical catalysts for the esterification polymerization are protonic acids, Lewis acids, titanium alkoxides, and dialkyl tin oxides.

Hydroxy carboxylic acid compounds such as 12-hydroxystearic acid may also be polymerized to produce a polyester diol. Such a reaction may be carried out with or without an initiating diol such as one of the diols already mentioned.

Polylactone diol reactants may also be used in preparing the elastomeric thermoplastic polyurethanes. The polylactone diols may be prepared by reacting a diol initiator, e.g., a diol such as ethylene or propylene glycol or another of the diols already mentioned, with a lactone. Lactones that can be ring opened by an active hydrogen such as, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these can be polymerized. The lactone ring can be substituted with alkyl groups of 1-7 carbon atoms. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring.

In preparing a polyether diol, a diol initiator such as ethylene glycol, propylene glycol, 1,4-butanediol, or another of the diols mentioned above is reacted with an oxirane-containing compound to produce a polyether diol. The oxirane-containing compound is preferably an alkylene oxide or cyclic ether, and more preferably it is a compound selected from ethylene oxide, propylene oxide, 1-butene oxide, tetrahydrofuran, and combinations of these. Other useful cyclic ethers that may be polymerized include, without limitation, 1,2-cyclohexene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The polyether polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonates may be prepared by polycondensation of aliphatic diols with dialkyl carbonates, (such as diethyl carbonate), cyclic glycol carbonates (such as cyclic carbonates having five- and six-member rings), or diphenyl carbonate, in the presence of catalysts like alkali metal, tin catalysts, or titanium compounds. or diphenyl carbonate. Another way to make aliphatic polycarbonates is by ring-opening polymerization of cyclic aliphatic carbonates catalyzed by organometallic catalysts. The polycarbonate diols can also be made by copolymerization of epoxides with carbon dioxide. Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol, such as the polymeric polyester diols and polyether diols described above, that are used in making an elastomeric thermoplastic polyurethane synthesis preferably have a number average molecular weight (determined for example by the ASTM D-4274 method) of from about 300 to about 8,000, or from about 300 to about 5000, or from about 300 to about 3000.

The synthesis of an elastomeric thermoplastic polyurethane may be carried out by reacting one or more of the polymeric diols, one or more compounds having at least two (preferably two) isocyanate groups, and, optionally, one or more chain extension agents. The elastomeric thermoplastic polyurethanes are preferably linear and thus the polyisocyanate component preferably is di-functional or substantially di-functional. Useful diisocyanate compounds used to prepare the elastomeric thermoplastic polyurethanes, include, without limitation, methylene bis-4-cyclohexyl isocyanate, cyclohexylene diisocyanate (CHDI), isophorone diisocyanate (IPDI), m-tetramethyl xylylene diisocyanate (m-TMXDI), p-tetramethyl xylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), 2,4-tolylene ("toluene") diisocyanate and 2,6-tolylene diisocyanate (TDI), 2,4'-methylene diphenyl diisocyanate (MDI), 4,4'-methylene diphenyl diisocyanate (MDI), o-, m-, and p-xylylene diisocyanate (XDI), 4-chloro-1,3-phenylene diisocyanate, naphthylene diisocyanates including 1,2-naphthylene diisocyanate, 1,3-naphthylene diisocyanate, 1,4-naphthylene diisocyanate, 1,5-naphthylene diisocyanate, and 2,6-naphthylene diisocyanate, 4,4'-dibenzyl diisocyanate, 4,5'-diphenyldiisocyanate, 4,4'-diisocyanatodibenzyl, 3,3'-dimethoxy-4,4-biphenylene diisocyanate, 3,3'-dimethyl-4,4'-biphenylene diisocyanate, 1,3-diisocyanatobenzene, 1,4-diisocyanatobertzene, and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400 g/mol. Alcohols and amines are preferred in some embodiments; diols are particularly preferred. Typical examples of useful diols that are used as polyurethane chain extenders include, without limitation, 1,6-hexanediol, cyclohexanedimethanol, 2-ethyl-1,6-hexanediol, 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, neopentyl glycol, dihydroxyalkylated aromatic compounds such as the bis(2-hydroxyethyl)ethers of hydroquinone and resorcinol; p-xylene-α,α'-diol; the bis (2-hydroxyethyl)ether of p-xylene-α, α'-diol; m-xylene-α,α'-diol and the bis(2-hydroxyethyl) ether; 3-hydroxy-2,2-dimethylpropyl 3-hydroxy-2,2-dimethylpropanoate; and mixtures thereof. Suitable diamine extenders include, without limitation, p-phenylenediamine, m-phenylenediamine, benzidine, 4,4'-methylenedianiline, 4,4'-methylenibis (2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to di-functional extenders, a small amount of tri-functional extenders such as trimethylolpropane, 1,2,6-hexanetriol and glycerol, or mono-functional active hydrogen compounds such as butanol or dimethyl amine, may also be present. The amount of tri-functional extenders or mono-functional compounds employed would preferably be a few equivalent percent or less based on the total weight of the reaction product and active hydrogen containing groups employed.

The reaction of the polyisocyanate(s), polymeric diol(s), and, optionally, chain extension agent(s) is typically conducted by heating the components, generally in the presence of a catalyst. Typical catalysts for this reaction include organotin catalysts such as stannous octoate or dibutyl tin dilaurate. Generally, the ratio of polymeric diol, such as polyester diol, to extender can be varied within a relatively wide range depending largely on the desired hardness of the elastomeric thermoplastic polyurethane. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 25% to about 65% by weight of the elastomeric thermoplastic polyurethane, and preferably from about 25% to about 50% by weight of the elastomeric thermoplastic polyurethane.

One nonlimiting example of commercially available elastomeric thermoplastic polyurethanes having a melt flow index of from about 160 to about 220 grams/10 min. (at 190° C., 21.6 kg) suitable for making the thermoplastic polyurethane foam beads is Elastollan® SP9213 (melt flow index of 200 g/10 min. (at 190° C., 21.6 kg)), which is available from BASF Polyurethanes GmbH.

A thermoplastic polyurethane that is more rigid may be synthesized in the same way but with a lower content of the polymeric diol segments. A rigid thermoplastic polyurethane may, for example, include from about 0 to about 25 percent by weight of the polyester, polyether, or polycarbonate diol segments. Synthesis of rigid polyurethanes is well-known in the art and described in many references. Rigid thermoplastic polyurethanes having a melt index of at least about 160 grams/10 min. (at 190° C., 21.6 kg) as measured according to ASTM D1238 are commercially available and include those sold under the trademark Isoplast® ETPU by Lubrizol Corp., Wickliffe, Ohio.

The thermoplastic polyurethane foam beads may be made from the elastomeric thermoplastic polyurethane by a method as disclosed in Fischer et al., WO 94/20568 and Prissok et al, US Patent Application Publications No. US 2010/0222442 and 2010/0047550, each of which are incorporated herein by reference. The flexible polyurethane foams made by such a process preferably have a proportion of open cells in accordance with DIN ISO 4590 of greater than 85%, particularly preferably greater than 90%.

The thermoplastic polyurethane foam beads may have a broad range of shapes, including generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. "Generally" is used here to indicate an overall shape that may have imperfections and irregularities, such as bumps, dents, imperfectly aligned edges, corners, or sides, and so on. In various embodiments, the thermoplastic polyurethane foam beads may preferably be generally spherical or ellipsoidal. In the case of non-spherical beads, for example ellipsoidal beads, the largest major diameter of a cross-section taken perpendicular to the major (longest) axis of the ellipsoid. The thermoplastic polyurethane foam beads may preferably have a diameter of from about 0.5 mm to about 1.5 cm. Ellipsoidal beads may be from about 2 mm to about 20 mm in length and from about 1 to about 20 mm in diameter. Each individual bead may be, for example, from about 20 to about 45 mg in weight. The foamed particles preferably have a compact outer skin. Here, reference to a compact skin means that the foam cells in the outer region of the foamed particles are smaller than those in the interior. Particular preference is given to the outer region of the foamed particles having no pores.

Figure 3:
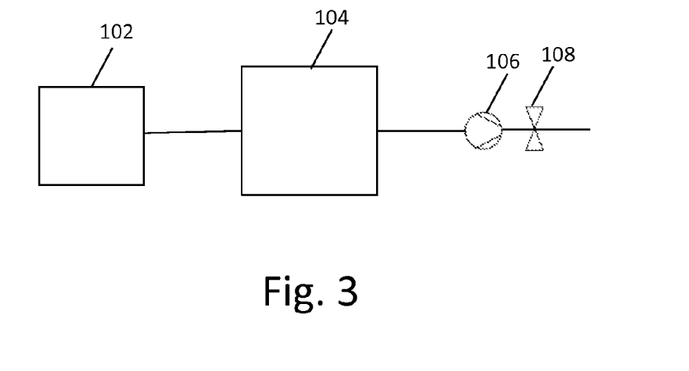
FIG. 3 illustrates a system for placement of the foam beads in a mold in an embodiment of the process.

The foam beads may be introduced into the mold in different ways. One way is simply place them in the cavity of an open mold, close the mold, and inject the foamable thermoplastic polyurethane or EVA matrix material over them, foaming the matrix material in the mold. In another way of introducing the foam beads into the mold, a port or hole is made in the mold that is large enough for the beads to flow through and into the mold. The beads may be pumped into the mold simultaneously with injection of the thermoplastic polyurethane elastomer or EVA elastomer matrix material. Again, the matrix material is foamed in the mold due to the presence of the blowing agent and supercritical fluid mixed into it. A vacuum may be pulled in the mold to aid in loading the beads. The vacuum-assisted loading of the foam beads also improves appearance of the molded part. As illustrated schematically in FIG. 3, foam beads 102 are drawn into mold 104 by pulling a vacuum 106. The vacuum may be controlled with a valve 108.

The mold may be designed to aid in even distribution of the foam beads throughout the mold cavity. For example, the mold may be equipped with retractable dams to direct the beads to fill areas and control bead distribution. Core back extension molding (opening the mold slightly after injection) helps to "cover up" any beads at the surface of the part. Core back extension molding may also aid in lowering the density of the molded part.

Thermoplastic TPU and EVA Elastomers

The thermoplastic polyurethane elastomer may have a melt index (also called a melt flow index or melt flow rate) of from about 5 to about 100 grams/10 min. (at 190° C., 8.7 kg) or from about 180 to about 300 grams/10 min. (at 200° C., 21.6 kg) as measured using the procedure of ASTM D1238. The thermoplastic ethylene-vinyl alcohol copolymer may have a melt index of from about 0.5 to about 50 grams/10 min. (at 190° C., 2.16 kg) as measured using the procedure of ASTM D1238. In various embodiments, the melt index for the polyurethane is preferably from about 5 to about 50 grams/10 min. (at 190° C., 8.7 kg), more preferably from about 15 to about 30 grams/10 min. (at 190° C., 8.7 kg) or preferably from about 180 to about 250 grams/10 min. (at 200° C., 21.6 kg), more preferably from about 180 to about 220 grams/10 min. (at 200° C., 21.6 kg) as measured using the procedure of ASTM D1238. In various embodiments, the melt index for the thermoplastic ethylene-vinyl alcohol copolymer is preferably from about 2.5 to about 10 grams/10 min. (at 190° C., 2.16 kg), more preferably from about 1 to about 10 grams/10 min. (at 190° C., 2.16 kg) as measured using the procedure of ASTM D1238.

Thermoplastic polyester polyurethane and polyether polyurethane elastomers can be produced as already described.

The polyurethanes may be used in any combination to make the low density foamed articles, including using combinations of thermoplastic polyether polyurethane elastomers and thermoplastic polyester polyurethane elastomers.

In certain embodiments it may be preferred to use an elastomer polyester polyurethane prepared from a polyester of a dicarboxylic acid having from 4 to about 8 carbon atoms, or its esterifiable derivatives such as anhydride or lower alkyl ester, and a diol having from about 4 to about 8 carbon atoms, particularly an unbranched diol. In certain embodiments, it may be preferred to use a polyester polyurethane prepared from a poly(ε-caprolactone) diol polyester or a polyether polyurethane prepared from a poly(tetrahydrofuran) polyether [also know as a poly(tetramethylene oxide) polyether or poly(tetramethylene ether) glycol]. These may be used in any combination.

In certain embodiments, preferred polyurethanes in the solid (unfoamed) form may have a Shore A hardness of from about 35 A to about 85 A, preferably from about 50 A to about 75 A, and more preferably from about 60 A to about 70 A, as measured by the method of according to ASTM D2240. In certain preferred embodiments, the polyurethane has a Shore A hardness of from about 50 A to about 80 A or from about 60 A to about 70 A and a melt flow index of from about 5 to about 100 grams/10 min. (at 190° C., 8.7 kg) or from about 180 to about 300 grams/10 min. (at 200° C., 21.6 kg)

Nonlimiting examples of suitable commercially available polyurethane elastomers include Elastollan® SP9213 (melt flow index of 200 g/10 min. (at 200° C., 21.6 kg), Elastollan® 1170, Elastollan® 1180, and a soft 45 A polyurethane version of these, which are available from BASF Polyurethanes GmbH; Texin® 1209, available from Bayer MaterialScience; and Estane MPD 00361B, available from the Lubrizol Corporation.

Elastomeric ethylene-vinyl acetate copolymers may be prepared by free-radical emulsion polymerization of ethylene and up to about 50% by weight vinyl acetate. The vinyl acetate monomer is usually at least about 10% by weight, preferably at least about 25% by weight of the monomers used. The ethylene-vinyl acetate copolymer has a vinyl acetate content of preferably from about 25 weight percent to about 50 weight percent and more preferably from about 35 weight percent to about 50 weight percent. The ethylene-vinyl acetate copolymers may have a melt flow index of from about 0.5 to about 50 grams/10 min. (at 190° C., 2.16 kg) as measured using the procedure of ASTM D1238. Nonlimiting examples of suitable commercially available ethylene-vinyl acetate copolymers include Elvax 265, Elvax 40L-3 from DuPont and Lavaprene 400 from Langxess. The ethylene-vinyl acetate copolymers may be used in combination.

Pellets, beads, particles, or other pieces of the polyurethane thermoplastic elastomer or ethylene-vinyl acetate copolymer (EVA) are introduced into an extruder along with a physical or chemical blowing agent other than a supercritical fluid, with the blowing agent being used in an amount up to about 15% by weight based on polymer weight. The blowing agent may preferably be one that contains or produces nitrogen or carbon dioxide. The pellets may have a regular or irregular shape, including generally spherical, cylindrical ellipsoidal, cubic, rectangular, and other generally polyhedral shapes as well as irregular or other shapes, including those having circular, elliptical, square, rectangular, or other polygonal cross-sectional outer perimeter shapes or irregular cross-sectional shapes with or without uniform widths or diameters along an axis. "Generally" is used here to indicate an overall shape that may have imperfections and irregularities, such as bumps, dents, imperfectly aligned edges, corners, or sides, and so on.

Blowing Agent (Other than a Supercritical Fluid)

The blowing agent may be incorporated into the polymer pellets or may be dry blended with the pellets. In general, the blowing agent may be used in amounts of from about 1% by weight to about 15% by weight, based on the total weight of the polymer. In various embodiments, blowing agent or blowing agents other than supercritical fluids may be used in amounts of from about 2% by weight to about 15% by weight, or from about 3% by weight to about 12% by weight, or from about 3% by weight to about 10% by weight, based on the weight of the polymer.

Physical foaming and blowing agents function as gas sources by undergoing a phase change. Suitable physical blowing and foaming agents may be selected from the group consisting of aliphatic hydrocarbons and their chloro- and fluoro-derivatives. Typical foaming and blowing agents may be selected from isomers of pentane, hexane, heptane, fluorocarbons, trichlorofluoromethane, dichlorodifluoromethane, dichlorotetrafluoroethane, monochlorodifluoromethane, and methylene chloride. Chemical foaming and blowing agents produce a gas via a chemical reaction. Suitable chemical foaming and blowing agents may be selected from, for example, azo-type compounds for the generation of $N_2$, ammonium compounds that generate $NH_3$, and mixtures of carbonates and acids that generate $CO_2$. Specific suitable examples include sodium bicarbonate, dinitrosopentamethylene-tetramine, sulfonyl hydroxides, azodicarbonamide, p-toluenesulfonyl semicarbazide, 5-phenyltetrazole, diisopropylhydrazodicarboxylate and sodium borohydrite. The thermal decomposition of the foaming or blowing agents can be lowered through addition of activators or accelerators, as is known in the art.

In another embodiment, microbeads containing physical blowing agent are used as a blowing agent. The microbeads are usually made of a shell of thermoplastic polymer with, in the core, a liquid, low-boiling gas based on alkanes. The preparation of these microbeads is described by way of example in U.S. Pat. Nos. 3,615,972, 6,509,384, 7,956,096, and 8,388,809 the disclosures of which are incorporated herein by reference. The microbeads typically have a diameter of from 5 to 50 μm. Examples of suitable microbeads are obtainable with Expancell® from Akzo Nobel.

The chemical or physical blowing agents may be used in any combination. The blowing agent or combination of blowing agents other than supercritical fluids may be incorporated into the polymer pellets (as in the common procedure of forming a masterbatch), may be dry blended with the polymer pellets before being added to the extruder, or may be added to the extruder separately from the pellets.

Other materials that may be used in thermoplastic elastomeric polyurethane or ethylene-vinyl acetate copolymer compositions that are foamed include, without limitation, colorants, particularly pigments; fillers, including clays, nanoclays, nanotubes, halloysite clay, which is available from Applied Minerals under the trademark Dragonite™, and so on; surfactants, release agents, antioxidants, stabilizers, crosslinkers that may be included in amounts that lightly crosslink the elastomer but leave the elastomer foam a thermoplastic, and so on.

Equipment and Process

In describing the equipment and process, "clamping force" refers to the force that holds together the two mold halves that define the mold cavity. The clamping force can be determined, for example, by multiplying the hydraulic pressure by the piston surface area in a clamping device (for hydraulic clamping devices), by measuring the force using a load cell associated with the mold halves and/or platens, or by measuring tie bar elongation or strain and converting to a clamping force. The term "injection pressure" refers to the pressure at which polymeric material is injected into the mold. The injection pressure can be determined, for example, by measuring the hydraulic load (for hydraulic injection systems) or by measuring the servomotor torque and multiplying it by the appropriate mechanical advantage factor of the system (for electrical injection systems). The term "supercritical fluid additive" refers to a supercritical fluid under temperature and pressure conditions within an extruder (e.g., 12, FIG. 1). The supercritical fluid additive may or may not be a supercritical fluid prior to introduction into the extruder (e.g., when supercritical fluid additive is in source 22, FIG. 1) and the supercritical fluid additive may be introduced into the polymeric material in the extruder in any flowable state, for example, as a gas, a liquid, or a supercritical fluid.

Figure 1A:
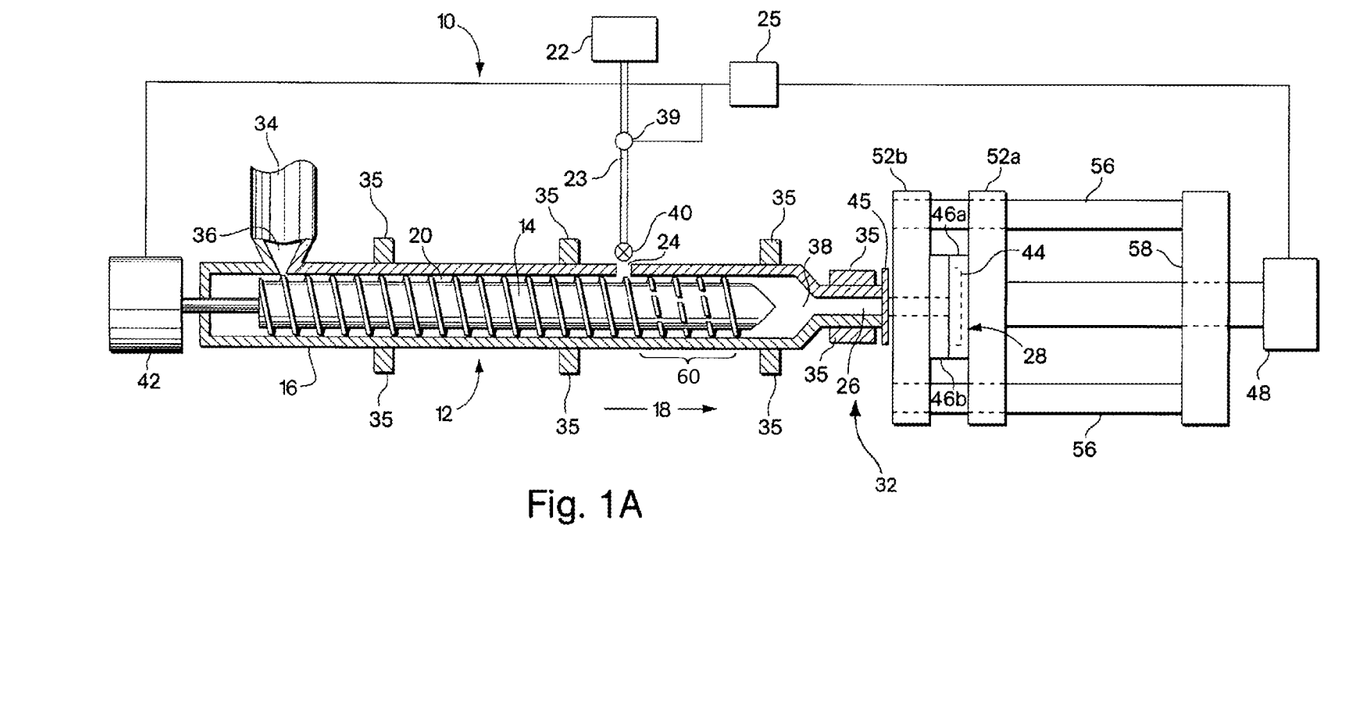
FIGS. 1A and 1B show an injection molding system that may be used in one embodiment of the disclosed process at different stages during the molding cycle.
Figure 1B:
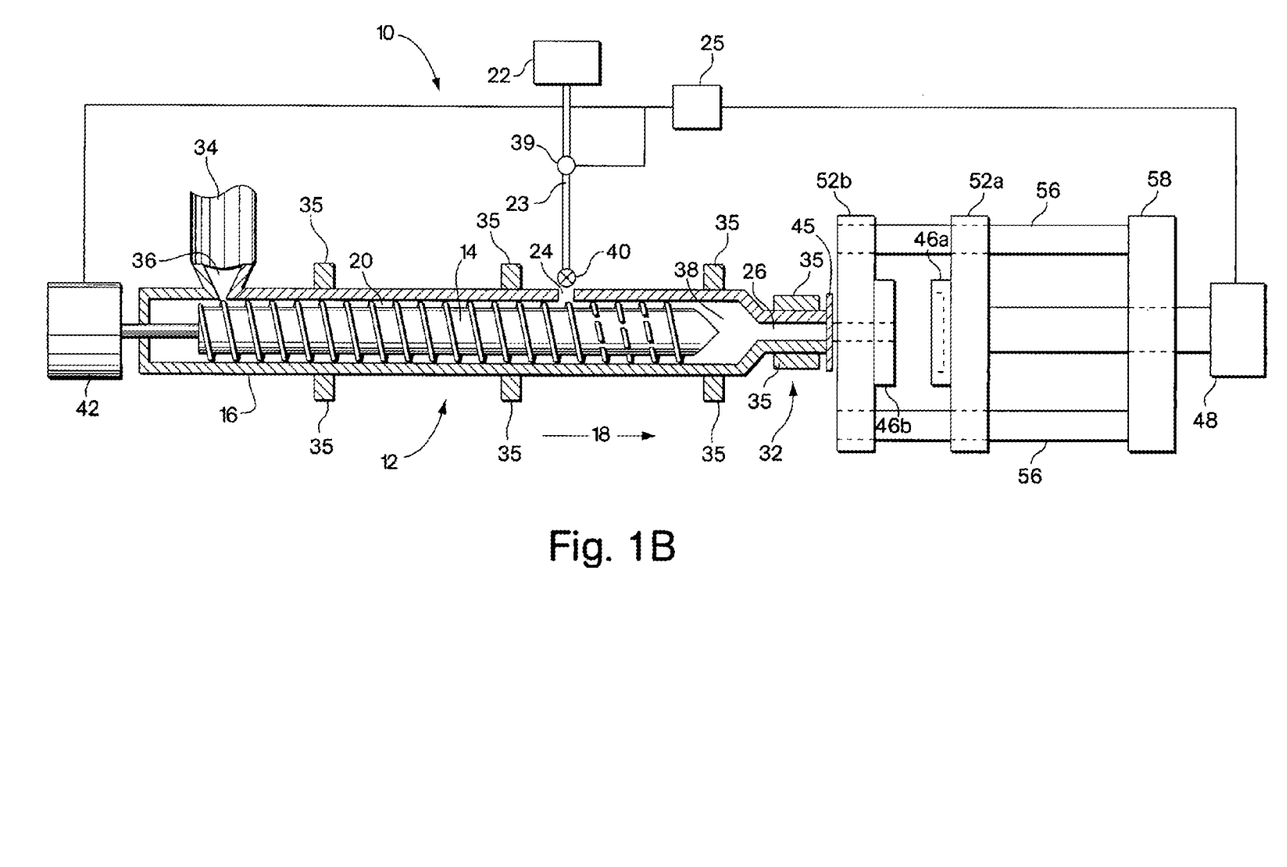

With reference now to the drawings, FIGS. 1A and 1B schematically illustrate an injection molding system 10 that may be used in one embodiment of the disclosed process. An extruder 12 of molding system 10 includes a polymer processing screw 14 that is rotatable within a barrel 16 to convey the polymeric material in a downstream direction 18 within a polymer processing space 20 defined between the screw and the barrel. A source 22 of supercritical fluid additive that is connected via conduit 23 to a port 24 formed within the barrel. Extruder 12 includes an outlet 26 connected to an injection mold 28. Optionally, system 10 includes a control system 25 that is capable of controlling the injection molding process and supercritical fluid additive introduction into the polymeric material.

Generally, injection molding system 10 operates cyclically to produce multiple molded articles. At the beginning of a typical molding cycle, screw 14 is positioned at a downstream end 32 of barrel 16. The thermoplastic polyurethane elastomer or EVA, typically in pelletized form, and the blowing agent other than supercritical fluid are fed into polymer processing space 20 from a hopper 34 through an orifice 36. Barrel 16 is heated by one or more heating units 35 and screw 14 rotates to knead and mix the melting polyurethane elastomer or EVA and blowing agent and to convey the mixture in downstream direction 18. The polyurethane elastomer or EVA and blowing agent mixture should be in a fluid state at the point of supercritical fluid additive introduction through port 24. The flow rate of supercritical fluid additive into the polymer mixture may be metered, for example, by a metering device 39 positioned between source 22 and port 24. The metering device 39 may also be connected to control system 25, which sends signals to control supercritical fluid additive flow rate. The molten polymer and supercritical fluid additive are mixed and conveyed downstream by the rotating screw and accumulated in a region 38 within the barrel downstream of the screw. The accumulation of the mixture in region 38 creates a pressure that forces the screw axially in an upstream direction in the barrel. After a sufficient charge of the mixture has been accumulated, screw 14 ceases to rotate and stops moving in the upstream direction. Preferably, when the screw stops the introduction of supercritical fluid additive into the polymeric material is, or has been, stopped, for example, by the operation of an injector valve 40 associated with port 24.

Then, the screw is moved axially in a downstream direction by an injection device 42 to downstream end 32 of the barrel, returning to the original screw position to inject the accumulated charge of the mixture through outlet 26 of the extruder and into a cavity 44 (FIG. 2A) defined between mold halves 46a, 46b. A shut-off nozzle valve 45 associated with the outlet of the extruder typically is opened to permit the mixture to flow into the cavity. After the charge is injected into the cavity, valve 45 is typically closed. As described further below and shown in FIGS. 2A and 2B, a clamping device 48 holds mold halves 46a, 46b of the mold 28 (FIG. 2A) together during injection and the subsequent cooling of the polymeric material. After the polymeric material sufficiently solidifies, clamping device 48 separates mold halves 46a, 46b (FIG. 1B) to eject a molded article. The molding cycle is repeated to produce additional molded articles.

The extruder screw injects the mixture at a preferred rate of from about 1 to about 5 inches per second (2.54 to about 12.7 cm/s). The mold may be heated, for example up to about 50° C. The injection pressure may be from about 9000 psi (62 MPa) to about 30,000 psi (207 MPa), preferably from about 18,000 psi (124.1 MPa) or from about 22,000 psi (152 MPa) to about 28,000 psi (193 MPa) or to about 30,000 psi (207 MPa), particularly preferably from about 18,000 psi (124.1 MPa) to about 28,000 psi (193 MPa). The mixture may be injected into the mold at an injection pressure of from about 110 MPa to about 207 MPa.

Molding system 10 may include a number of variations from the illustrative embodiment as known to one of ordinary skill in the art. For example, a mold may define more than one cavity in which articles may be molded and may include a hot runner gate to introduce polymeric material into the cavities. The hot runner gate may also be provided with a valve to selectively control introduction of the polyurethane or EVA material. It should also be understood that the injection molding system may be a hydraulic system, an electrical system, or a hybrid hydraulic/electric system.

Control system 25 can coordinate the operation of metering device 39 with screw 14 so that a desired amount of supercritical fluid additive is introduced into the polymeric material to form a mixture having the desired weight percentage of supercritical fluid additive. In some embodiments, a first controller controls the operation of the injection molding system and a second controller controls supercritical fluid additive introduction. In other embodiments, a single controller controls operation of the injection molding system and supercritical fluid additive introduction.

Figure 2A:
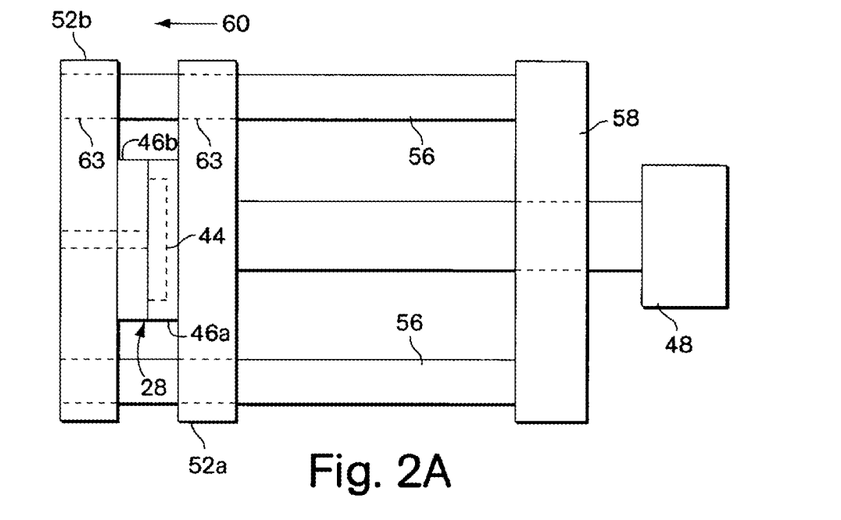
FIGS. 2A and 2B are exploded views of the injection mold and the clamping device of the injection molding system of FIGS. 1A and 1B.
Figure 2B:
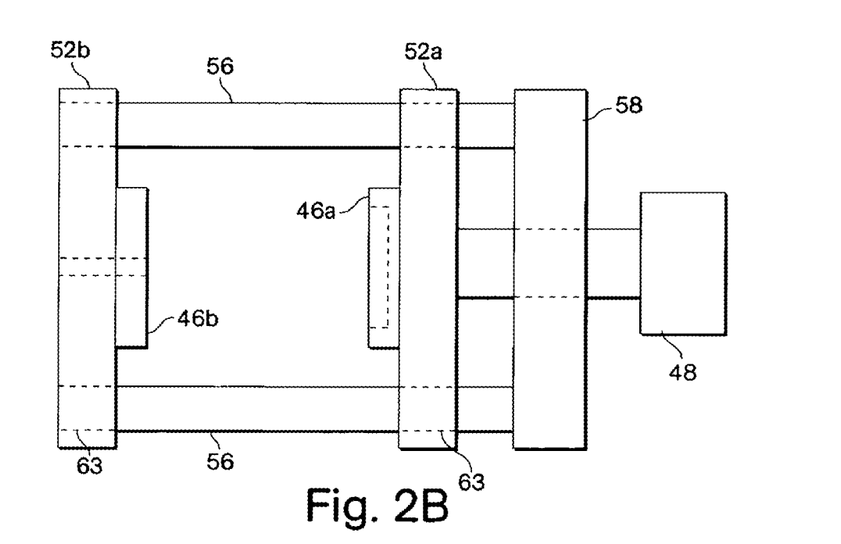

Referring to FIGS. 2A and 2B, injection mold 28 and clamping device 48 are shown. In the illustrative embodiment, mold half 46a is secured to a movable platen 52a, and mold half 46b is secured to a fixed platen 52b. Platen 52a is slideably mounted on a plurality of tie bars 56 which extend from a backside 58 of system 10 to fixed platen 52b. Platen 52a reciprocates on tie bars 56 to open and close mold 28 in response to the action of clamping device 48 which is synchronized with the molding cycle. Mold 28 is closed when clamping device 48 pushes platen 52a in the direction of arrow 60, which forces mold half 46a against mold half 46b (FIG. 2A). Clamping device 48 holds mold halves 46a, 46b together with a clamping force during injection and while the molded part cools. To open the mold, clamping device retracts platen 52a in a direction opposite arrow 60 which separates mold halves 46a, 46b (FIG. 2B).

Other configurations of the injection mold and clamping device may also be used in the disclosed process. For example, in some cases, the mold may not include platens, but rather the movable mold half may be secured directly to the clamping device and the other mold half secured to the frame of the system. In other embodiments, a pressure measuring device may be associated with mold cavity 44 to monitor pressure within the mold (i.e., cavitation pressure). The pressure measuring device may, for example, access the mold cavity through a wall of one of the mold halves. The pressure measuring device can send output signals representative of the cavitation pressure, for example, to control system 25 to control various molding parameters such as injection speed and injection force.

Clamping device 48 may be any suitable type. Clamping device 48 may be hydraulically or mechanically/electrically powered. A clamping device can be characterized by the maximum force it is capable of providing. Suitable clamping devices may provide a maximum force, for example, of between about 10 tons-force (98 kN) and about 10,000 tons-force (98,000 kN), and more typically between about 50 tons-force (490 kN) and about 3,000 tons-force (about 29,420 kN). The specific clamping force depends on various factors, such as the article being molded.

Clamping device 48 generally needs to provide a clamping force sufficient to prevent polymeric material injected into cavity 44 from flashing between mold halves 46a, 46b.

Figures 4, 5, 6:
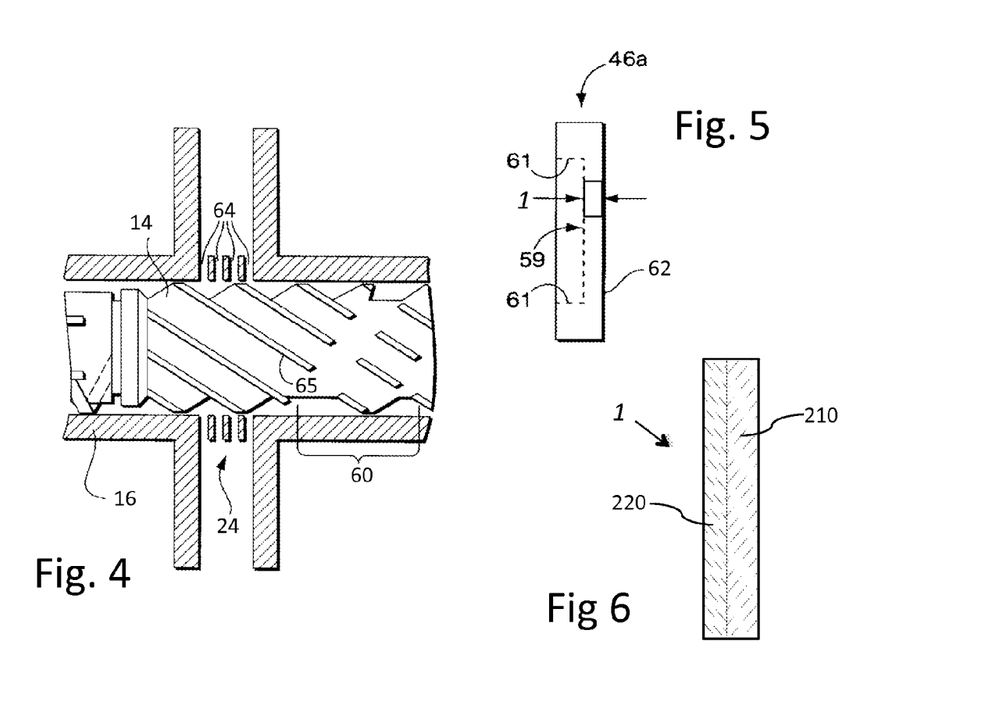
FIG. 4 illustrates a multi-hole blowing agent feed orifice arrangement and extrusion screw that may be used in embodiments of the process.
FIG. 5 illustrates the work surface area and the platen of a mold that may be used in the disclosed injection molding process.
FIG. 6 illustrates an embodiment of a mold that may be used in the in the disclosed injection molding process.

As shown in FIGS. 5 and 6, mold back surface 59 at arrows 1 includes a porous tool 220 in mold cavity 44 adjacent mold wall 210. The porous tool may be located anywhere adjacent an inner mold surface, such as along the back surface 59 as shown, a side surface 61, or a surface of the fixed mold half 46b, adjacent more than one area of the inner mold surface, or adjacent all inner surfaces, The porous tool may be an insert that is generally the dimensions of the mold cavity, or may be one or a plurality of smaller inserts—for example, three to five inserts—spaced within the mold cavity. The porous tool, or all of the porous tools collectively placed in the mold, may have a pore size of from about 3 μm to about 20 μm, preferably from about 7 μm to about 12 μm, for absorbing gas generated during foaming of the molded article. The porous tool may be a porous metal or metal alloy, such as a porous aluminum or a porous steel, a porous ceramic, such as a porous cordierite, zirconium oxide, silicon carbide, aluminum oxide, or silicon nitride ceramic, or another porous material that does not melt or soften at the temperatures reached during the molding process. Open cell metal and ceramic foams or sintered porous metal materials, which can be made from metal powders, can be fabricated as a porous tool in a desired shape to fit in one or more areas inside the mold cavity and absorb gas during foaming of the polymer.

The porous tool may also have any desired shape and be placed at a desired location or locations within the mold cavity. For example, the porous tool may have a feature extending into the mold cavity.

Supercritical Fluid

The supercritical fluid additive may have a variety of compositions including nitrogen, carbon dioxide, and mixtures thereof. According to one preferred embodiment, the supercritical fluid additive is carbon dioxide. In another preferred embodiment the supercritical fluid additive is nitrogen. In certain embodiments, the supercritical fluid additive is solely carbon dioxide or nitrogen.

Supercritical $CO_2$ may be combined with the polymer in an amount of from about 0.1 weight percent to about 5 weight percent, preferably from about 0.5 weight percent to about 5 weight percent, more preferably from about 0.5 to about 3 weight percent, and still more preferably from about 1 weight percent to about 3 weight percent based on polymer weight. Supercritical $N_2$ may be combined with the polymer in an amount of from about 0.1 weight percent to about 4 weight percent, preferably from about 0.4 weight percent to about 2.5 weight percent, and more preferably from about 0.7 weight percent to about 1.5 weight percent based on polymer weight.

When forming microcellular materials, it may be preferable to form a single-phase solution of polymeric material and supercritical fluid additive before extruding or injection molding the polymer mixture. To aid in the formation of a single-phase solution, supercritical fluid introduction may be done through a plurality of ports 24 arranged in the barrel, though it should be understood that a single port may also be utilized to form a single-phase solution. When multiple ports 24 are utilized, the ports can be arranged radially about the barrel or in a linear fashion along the axial length of the barrel. An arrangement of ports along the length of the barrel can facilitate injection of supercritical fluid additive at a relatively constant location relative to the screw when the screw moves axially (in an upstream direction) within the barrel as the mixture of polymeric material and supercritical fluid additive is accumulated. Where radially-arranged ports are used, ports 24 may be placed in equally-spaced positions about the extruder barrel, or in any other configuration as desired. Port 24 (FIGS. 1A, 1B) may include a single orifice or a plurality of orifices. In the multi-orifice embodiments the port may include at least about 2, and some cases at least about 4, and others at least about 10, and others at least about 40, and others at least about 100, and others at least about 300, and others at least about 500, and in still others at least about 700 orifices. In another embodiment, port 24 includes an orifice containing a porous material that permits supercritical fluid additive to flow through and into the barrel, without the need to machine a plurality of individual orifices.

To further promote the formation of a single-phase solution, port 24 may be located at a section of the screw that may include full, unbroken flight paths. In this manner, each flight, passes or "wipes" the port including orifices periodically, when the screw is rotating. This wiping increases rapid mixing of supercritical fluid additive and polymeric material in the extruder and the result is a distribution of relatively finely divided, isolated regions of supercritical fluid additive in the polymeric material immediately upon injection into the barrel and prior to any mixing. Downstream of port 24, the screw may include a mixing section which has highly broken flights to further mix the polymeric material and supercritical fluid additive mixture to promote formation of a single-phase solution.

FIG. 4 illustrates an embodiment of the extruder 12 of FIG. 1 in which the supercritical fluid additive port is illustrated in greater detail and, in addition, two ports on opposing top and bottom sides of the barrel are shown. In this embodiment, port 24 is located in the injection section of the screw at a region upstream from mixing section 160 of screw 14 (including highly-broken flights) at a distance upstream of the mixing section of no more than about 4 full flights, preferably no more than about 2 full flights, or no more than 1 full flight. Positioned in this way, injected supercritical fluid additive is very rapidly and evenly mixed into the polymer melt to produce a single-phase solution of the supercritical fluid in the polymer melt.

Port 24, in the preferred embodiment illustrated, is a multi-hole port including a plurality of orifices 64 connecting the blowing agent source with the extruder barrel. As shown, in preferred embodiments a plurality of ports 24 are provided about the extruder barrel at various positions radially and can be in alignment longitudinally with each other. For example, a plurality of ports 24 can be placed in spaced positions about the extruder barrel, each including multiple orifices 64. In this manner, where each orifice 64 is considered a supercritical fluid additive orifice, there may be at least about 10, preferably at least about 40, more preferably at least about 100, more preferably at least about 300, more preferably at least about 500, and more preferably still at least about 700 supercritical fluid additive orifices in fluid communication with the extruder barrel.

Also in preferred embodiments is an arrangement (as shown in FIG. 4) in which the blowing agent orifice or orifices are positioned along the extruder barrel at a location where, when a preferred screw is mounted in the barrel, the orifice or orifices are adjacent full, unbroken flights 65. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing.

The foamed thermoplastic elastomeric polyurethane article may have a density of less than about 0.3 $g/cm^3$, preferably less than about 0.25 $g/cm^3$, more preferably less than about 0.2 $g/cm^3$. In various embodiments, the foamed thermoplastic elastomeric polyurethane article may have a density of from about 0.15 to about 0.3 $g/cm^3$, or a density of from about 0.15 to about 0.25 $g/cm^3$, or a density of from about 0.15 to about 0.2 $g/cm^3$.

The foamed thermoplastic elastomeric EVA article may have a density of less than about 0.3 $g/cm^3$, preferably less than about 0.25 $g/cm^3$, more preferably less than about 0.2 $g/cm^3$. In various embodiments, the foamed thermoplastic elastomeric polyurethane article may have a density of from about 0.15 to about 0.3 $g/cm^3$, or a density of from about 0.15 to about 0.25 $g/cm^3$, or a density of from about 0.15 to about 0.2 $g/cm^3$.

The shaped article may be of any dimensions. For example, the molded article may be sized as a cushion or cushioning element that can be included in an article of footwear, for example part of a footwear upper, such as a foam element in a collar or tongue, as an insole, as a midsole or a part of a midsole, or an outsole or a part of an outsole; foam padding in shinguards, shoulder pads, chest protectors, masks, helmets or other headgear, knee protectors, and other protective equipment; an element placed in an article of clothing between textile layers; in clothing, or may be used for other known padding applications for protection or comfort, especially those for which weight of the padding or cushioning is a concern. The molded article may be incorporated as cushioning into other articles.

In various embodiments, the molded article is a midsole for an article of footwear. A midsole provides cushioning in the footwear. A midsole should be durable but also preferably adds as little weight as possible to the footwear while still cushioning to the desired degree. A midsole also should be able to be bonded to an outsole, an upper, or any other components (e.g., a shank, an airbag, or decorative components) in making an article of footwear.

In other embodiments, the molded article is an outsole for an article of footwear.

The invention is further described in the following examples. The examples are merely illustrative of various embodiments. All parts are parts by weight unless otherwise noted.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for making a low density foamed article, comprising:
   placing an amount of thermoplastic polyurethane foam beads in a cavity of a mold and closing the mold, wherein the thermoplastic polyurethane foam beads have a density of from about 0.01 $g/cm^3$ to about 0.1 $gm/cm^3$;
   combining in an extruder connected to the mold a molten thermoplastic polyurethane elastomer with
   (a) chemical blowing agent and
   (b) a supercritical fluid,
   to form a mixture, wherein the blowing agent (a) is present in an amount up to about 15 weight percent based on total polymer weight in the mixture and the supercritical fluid (b) comprises at least one of about 0.1 to about 5 weight percent of supercritical $CO_2$ based on total polymer weight and about 0.1 to about 4 weight percent of supercritical $N_2$ based on total polymer weight, and injecting the mixture into the mold and foaming the mixture to form a foamed article,
   injecting the mixture into the mold at an injection pressure of from 110 MPa to about 207 MPa; and
   wherein the foamed article has a density of about 0.2 to less than 0.3 $g/cm^3$.

2. A method according to claim 1, wherein the mold comprises a porous tool.

3. A method according to claim 1, wherein the thermoplastic polyurethane foam beads comprise a thermoplastic polyurethane with a melt flow index of at least about 160 grams/10 min. as measured according to ASTM D1238 using a 21.6 kg weight and a temperature of 190° C.

4. A method according to claim 1, wherein the thermoplastic polyurethane foam beads comprise an elastomeric thermoplastic polyurethane with a melt flow index of from about 180 to about 250 grams/10 min. as measured according to ASTM D1238 using a 21.6 kg weight and a temperature of 190° C.

5. A method according to claim 1, wherein the thermoplastic polyurethane foam beads comprise an elastomeric thermoplastic polyurethane selected from the group consisting of thermoplastic polyester-polyurethanes, polyether-polyurethanes, and polycarbonate-polyurethanes.

6. A method according to claim 1, wherein the thermoplastic polyurethane foam beads comprise elastomeric thermoplastic polyester-polyurethane.

7. A method according to claim 1, wherein the thermoplastic polyurethane foam beads comprise an elastomeric thermoplastic polyether-polyurethane.

8. A method according to claim 7, wherein the elastomeric thermoplastic polyether-polyurethane is a reaction product of diphenylmethane diisocyanate.

9. A method according to claim 1, wherein the thermoplastic polyurethane foam beads have a diameter of from about 0.5 mm to about 1.5 cm.

10. A method according to claim 1, wherein the molten polymer comprises a thermoplastic polyurethane elastomer having a solid Shore A hardness of from about 35 A to about 85 A.

11. A method according to claim 1, wherein the chemical blowing agent is present in an amount from about 3 to about 12 weight percent based on total polymer weight in the mixture.

12. A method according to claim 1, wherein the supercritical fluid is one of from about 0.5 to about 3 weight percent of supercritical $CO_2$ based on total polymer weight in the mixture or from about 0.4 to about 2.5 weight percent of supercritical $N_2$ based on total polymer weight in the mixture.

13. A method according to claim 1, wherein the mixture further comprises a crosslinker.

14. A method according to claim 2, wherein the porous tool has a pore size of from about 3 micrometers to about 20 micrometers.

15. A method according to claim 2, wherein the porous tool is a porous metal or metal alloy.

16. A method according to claim 2, wherein the porous tool is an insert having dimensions of the mold cavity.

17. A method according to claim 2, wherein the porous tool comprises a plurality of inserts spaced within the mold cavity.

18. A method according to claim 1, wherein the molten polymer is selected from the group consisting of thermoplastic polyurethane elastomers having a melt index of from about 5 to about 100 grams/10 min. using an 8.7 kg weight and a temperature of 190° C. or from about 180 to about 300 grams/10 min. using a 21.6 kg weight and a temperature of 200° C. and thermoplastic ethylene-vinyl acetate copolymers having a melt index of from about 0.5 up to about 50 grams/10 min. using a 21.6 kg weight and a temperature of 190° C.

19. A method for making a low density foamed article, comprising:
placing an amount of thermoplastic polyurethane foam beads in a cavity of a mold and closing the mold, wherein the thermoplastic polyurethane foam beads have a density of from about 0.01 g/cm³ to about 0.1 gm/cm³;
combining in an extruder connected to the mold a molten thermoplastic polyurethane elastomer with
(a) a chemical blowing agent and
(b) a supercritical fluid,
to form a mixture, wherein the blowing agent (a) is present in an amount up to about 15 weight percent based on total polymer weight in the mixture and the supercritical fluid (b) comprises at least one of about 0.1 to about 5 weight percent of supercritical $CO_2$ based on total polymer weight or about 0.1 to about 4 weight percent of supercritical $N_2$ based on total polymer weight and
injecting the mixture into the mold and foaming the mixture to form a foamed article, wherein the mixture is injected into the mold at an injection pressure of from 110 MPa to about 207 MPa;
wherein the foamed article has a density of less than 0.3 g/cm³; and
wherein the mold comprises a porous tool.

20. A foamed article made by the method of claim 1.

21. A foamed article according to claim 20, wherein the article has a density of from about 0.2 to less than 0.3 g/cm³.

22. A foamed article according to claim 20, wherein the article is a cushion or cushioning element for an article of footwear, protective equipment, or clothing.

23. A method or making a low density foamed article, comprising:
placing an amount of thermoplastic polyurethane foam beads in a cavity of a mold and closing the mold, wherein the thermoplastic polyurethane foam beads have a density of from about 0.01 g/cm³ to about 0.1 gm/cm³;
combining in an extruder connected to the mold a molten thermoplastic polyurethane elastomer with
(a) a chemical blowing agent and
(b) a supercritical fluid,
to form a mixture, wherein the blowing agent (a) is present in an amount up to about 15 weight percent based on total polymer weight in the mixture and the supercritical fluid (b) comprises at least one of about 0.1 to about 5 weight percent of supercritical $CO_2$ based on total polymer weight or about 0.1 to about 4 weight percent of supercritical $N_2$ based on total polymer weight, and
injecting the mixture into the mold and foaming the mixture,
wherein the molten polymer comprises a thermoplastic polyurethane elastomer having a solid Shore A hardness of from about 35 A to about 85 A; and
wherein the mixture is injected into the mold at an injection pressure of from 124.1 MPa to about 207 MPa.

24. A method according to claim 23, wherein the mold comprises a porous tool.

25. A method according to claim 24, wherein the porous tool has a pore size of from about 3 micrometers to about 20 micrometers.

26. A method according to claim 24, wherein the porous tool is a porous metal or metal alloy.

27. A method according to claim 24, wherein the porous tool is an insert having dimensions of the mold cavity.

28. A method according to claim 24, wherein the porous tool comprises a plurality of inserts spaced within the mold cavity.

29. A method according to claim 23, wherein the thermoplastic polyurethane foam beads comprise a thermoplastic polyurethane with a melt flow index of at least about 160 grams/10 min. as measured according to ASTM D1238 using a 21.6 kg weight and a temperature of 190° C.

30. A method according to claim 23, wherein the thermoplastic polyurethane foam beads comprise an elastomeric thermoplastic polyurethane with a melt flow index of from about 180 to about 250 grams/10 min. as measured according to ASTM D1238 using a 21.6 kg weight and a temperature of 190° C.

31. A method according to claim 23, wherein the thermoplastic polyurethane foam beads comprise an elastomeric thermoplastic polyurethane selected from the group consisting of thermoplastic polyester-polyurethanes, polyether-polyurethanes, and polycarbonate-polyurethanes.

32. A method according to claim 23, wherein the thermoplastic polyurethane foam beads comprise elastomeric thermoplastic polyester-polyurethane.

33. A method according to claim 23, wherein the thermoplastic polyurethane foam beads comprise an elastomeric thermoplastic polyether-polyurethane.

34. A method according to claim 23, wherein the elastomeric thermoplastic polyether-polyurethane is a reaction product of diphenylmethane diisocyanate.

35. A method according to claim 23, wherein the thermoplastic polyurethane foam beads have a diameter of from about 0.5 mm to about 1.5 cm.

36. A method according to claim 23, wherein the molten polymer comprises a thermoplastic polyurethane elastomer having a solid Shore A hardness of from about 35 A to about 85 A.

37. A method according to claim 23, wherein the chemical blowing agent is present in an amount from about 3 to about 12 weight percent based on total polymer weight in the mixture.

38. A method according to claim 23, wherein the supercritical fluid is one of from about 0.5 to about 3 weight percent of supercritical $CO_2$ based on total polymer weight in the mixture or from about 0.4 to about 2.5 weight percent of supercritical $N_2$ based on total polymer weight in the mixture.

39. A method according to claim 23, wherein the mixture further comprises a crosslinker.

40. A foamed article made by the method of claim 23.

41. A foamed article according to claim 39, wherein the article has a density of from about 0.2 to less than 0.3 $g/cm^3$.

42. A foamed article according to claim 39, wherein the article is a cushion or cushioning element for an article of footwear, protective equipment, or clothing.

\* \* \* \* \*